(12) United States Patent
Takashima et al.

(10) Patent No.: US 7,843,461 B2
(45) Date of Patent: Nov. 30, 2010

(54) IMAGE SPECIAL EFFECT DEVICE, GRAPHIC PROCESSOR AND RECORDING MEDIUM

(75) Inventors: Akihiro Takashima, Kanagawa (JP); Masaaki Shino, Kanagawa (JP); Taku Yokoyama, Kanagawa (JP); Hideyuki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 504 days.

(21) Appl. No.: 11/478,157

(22) Filed: Jun. 29, 2006

(65) Prior Publication Data

US 2007/0002048 A1 Jan. 4, 2007

(30) Foreign Application Priority Data

Jul. 4, 2005 (JP) ............................. 2005-195221

(51) Int. Cl.
*G09G 5/00* (2006.01)
(52) U.S. Cl. ........................ 345/582; 345/587; 345/605
(58) Field of Classification Search ......... 345/582–588, 345/605
See application file for complete search history.

(56) References Cited

U.S. PATENT DOCUMENTS

| | | | | |
|---|---|---|---|---|
| 5,262,965 A | * | 11/1993 | Putnam et al. | ................ 358/1.1 |
| 5,642,137 A | * | 6/1997 | Kitazumi | ..................... 345/605 |
| 5,742,295 A | * | 4/1998 | Lindholm | ................... 345/427 |
| 5,909,219 A | * | 6/1999 | Dye | ............................. 345/582 |
| 6,226,012 B1 | * | 5/2001 | Priem et al. | ................. 345/606 |
| 6,778,187 B1 | * | 8/2004 | Yi | ............................... 345/605 |
| 6,791,561 B1 | * | 9/2004 | Dawson | ...................... 345/582 |
| 7,256,781 B2 | * | 8/2007 | Shioya | ........................ 345/426 |
| 2003/0117399 A1 | * | 6/2003 | Nagasaki et al. | ............ 345/428 |
| 2004/0061700 A1 | * | 4/2004 | Shioya | ........................ 345/426 |

FOREIGN PATENT DOCUMENTS

| | | |
|---|---|---|
| JP | 2002-083316 | 3/2002 |
| JP | 2002-109564 | 4/2002 |
| JP | 2003-157445 | 5/2003 |
| JP | 2004-126692 | 4/2004 |

OTHER PUBLICATIONS

Japanese Office Action dated Nov. 17, 2009.

* cited by examiner

*Primary Examiner*—Xiao M Wu
*Assistant Examiner*—Charles Tseng
(74) *Attorney, Agent, or Firm*—Frommer Lawrence & Haug LLP; William S. Frommer; Ellen Marcie Emas

(57) ABSTRACT

An image special effect device includes: a graphic processor and a video processing block; the graphic processor converting coordinates in virtual three-dimensional space into two-dimensional coordinates on a display screen in accordance with a supply of information on the shape of a model in the virtual three-dimensional space, computing texture coordinates of an image that is pasted on the display screen and a reduction rate of the model on the display screen, and outputting information on the texture coordinates and reduction rate from an image data output unit; the video processing block writing input video data YUV into a memory after filtered by using a pre-filter coefficient corresponding to information on the reduction rate supplied from the graphic processor, and reading out the video data from the memory by using the supplied texture coordinates as information of read-address.

14 Claims, 5 Drawing Sheets

IMAGE SPECIAL EFFECT DEVICE, GRAPHIC PROCESSOR AND RECORDING MEDIUM

CROSS REFERENCES TO RELATED APPLICATIONS

The present invention contains subject manner related to Japanese Patent Application JP 2005-195221 filed in the Japanese Patent Office on Jul. 4, 2005, the entire contents of which being incorporated herein by reference.

BACKGROUND OF THE INVENTION

1. Field of the Invention

The present invention relates to an image special effect device for transforming video data into an arbitrary shape by texture mapping, and to a graphic processor and the like that are used in the image special effect device.

2. Description of the Related Art

An image special effect device (effector) has been known as one of devices that constitute a non-linear editing system for broadcast and commercial use. The image special effect device for broadcast and commercial use is a device that performs transformation processing such as expansion, reduction and rotation of video data (moving image data) by a hardware circuit.

As for the image special effect device for broadcast and commercial use of related art, transformable patterns are limited to several kinds in advance by a manufacturer in order to avoid hardware size being enlarged and cost increase, and therefore the transformation can be performed only using the limited patterns.

On the other hand, in the field of computer graphics, an image transformation method called texture mapping is carried out by using a graphic processor that is a processor exclusively used for image processing at comparatively low cost. The texture mapping is a method in which an image (texture) is pasted to a model that is prepared by combining polygons in virtual three dimensional space.

As is known, a vertex shader for geometric processing and a pixel shader for rendering processing are installed in the graphic processor. Lately, a graphic processor in which these shaders are programmable has become the mainstream.

In the texture mapping, however, aliasing that is a phenomenon in which the edge of texture pasted is seen as jag along pixels of a display screen is caused depending on a size of the model on the display screen (this size is reduced correspondingly to a distance from a view point to a model). In a graphic processor, MIPMAP (Multum In Parvo Mapping) method is employed to control this aliasing. In the MIPMAP method, textures obtained by reducing the same image using a plurality of discrete reduction rates (1, ½, ¼, ⅛ . . . ) are stored in a memory in advance and the texture having a reduction rate close to a reduction rate of a model on the display screen is selected (refer to Japanese Published Patent Application No. 2002-83316 (paragraph No. 0004), for example).

SUMMARY OF THE INVENTION

In an image special effect device for broadcast and commercial use of related art, it is difficult for a user to determine a transformation pattern arbitrarily, because transformation patterns are limited, as mentioned above.

Further, if hardware circuits for transforming video data into an arbitrary shape are added to the image special effect device for broadcast and commercial use, hardware size may be enlarged and cost may increase.

On the contrary, in a graphic processor that is used in the field of computer graphics, an image can be transformed into an arbitrary shape by texture mapping. However, the graphic processor is not suitable for processing video data in the broadcast and commercial field because of the following reasons.

(1) Degradation of Image Quality by MIPMAP Method

In the MIPMAP method, aliasing may not be controlled sufficiently in the case in which a reduction rate of a model on a display screen does not correspond with a reduction rate of a texture that is prepared in advance. Because of this, the MIPMAP method does not satisfy the image quality that may be required in the broadcast and commercial field.

(2) Degradation of Image Quality by Color Space Conversion

The graphic processor is configured to process image data in RGB (Red, Green and Blue) color space. Because of this, in order to perform texture mapping on video data in the YUV (luminance and chrominance difference) space that is used in the broadcast and commercial field, it is necessary to perform conversion processing of color space (conversion from YUV space to RGB space and conversion from RGB space to YUV space) when video data is input to and output from the graphic processor. However, because a range of color capable of being expressed is different between the YUV space and RGB space, there is no guarantee for obtaining the same image as input video after the color space conversion is performed.

(3) Limitation of Resolution of Image Data

The graphic processor can only process the image data of resolution up to 8 bits. Therefore, high quality video data of 10 bits that is the mainstream in the broadcast and commercial field may not be processed.

(4) Limitation of Processing Speed

In the case where high-resolution video data is processed in the graphic processor, since a period of time to access a memory which stores video data as a texture becomes long, it becomes difficult to process the video data in real time.

The present invention addresses the above-identified, and other problems associated with conventional methods and devices.

It is desirable to satisfy image quality and real-time processing that may be required in the broadcast and commercial field, and also it is desirable to transform video data into an arbitrary shape by texture mapping without causing hardware size to be enlarged and cost increase.

According to an embodiment of the present invention, there is provided an image special effect device that includes: a graphic processor in which a programmable shader is installed and a video processing block which is configured with hardware circuits. The graphic processor is programmed to execute processing of converting coordinates in virtual three-dimensional space into two-dimensional coordinates on a display screen in accordance with a supply of information on the shape of a model in the virtual three-dimensional space and computing texture coordinates of an image pasted on the display screen and a reduction rate of the model on the display screen. The graphic processor is programmed further to execute processing of outputting information on the texture coordinates and the reduction rate from an image data output unit. The video processing block includes: a pre-filter that performs filtering of input video data by using a pre-filter coefficient corresponding to information on a reduction rate supplied; a memory to which the video data filtered by this pre-filter is written; and a control circuit that reads out the video data from the memory by using texture coordinates supplied as information of read-address. In this image special effect device, information on the texture coordinates and information on the reduction rate that are output from the graphic processor are supplied to the control circuit of the video processing block and to the pre-filter of the video processing block, respectively.

Further, according to an embodiment of the present invention, there is provided an image special effect device in which information on texture coordinates and reduction rate that are computed by the graphic processor offline (in the state where the video processing block is away from the processor) is supplied to the video processing block by means of a recording medium or networks.

Further, according to an embodiment of the present invention, there is provided a recording medium in which a program, by which the above graphic processor works and an existing graphic processor with a programmable shader installed works as the above graphic processor, is recorded.

According to an embodiment of the present invention, among processing of texture mapping, processing not related to image quality that computes and outputs information on the transformed shape (texture coordinates and reduction rate) and the like of an image is performed by programming an existing programmable graphic processor.

In other words, in a typical method using a graphic processor of related art, information on texture coordinates and reduction rate is used only within the graphic processor and image data finally transformed is output from the graphic processor. However, according to an embodiment of the present invention, it is so programmed that information itself on texture coordinates and reduction rate is output from an image data output unit of the graphic processor.

A period of time necessary for computation and output processing of information on such texture coordinates and reduction rate is constant regardless of resolution of video data, and so real-time processing can be performed advantageously.

On the other hand, processing of video data itself (that is processing related to image quality) is performed by a video processing block configured with hardware circuits, based on information output from the graphic processor.

In the video processing block, filtering (reduction) of input video data is performed in accordance with information on a reduction rate supplied from the graphic processor. Then, after written into a memory, the video data is read out from the memory by using information on texture coordinates supplied from the graphic processor as a read-address, and the video data is pasted onto a model on a display screen. Therefore, the filtering corresponding to the reduction rate of a model on the display screen is suitably performed on the video data and then the video data is pasted, and so aliasing can be controlled sufficiently.

Further, as described above, by processing the video data using another hardware circuit provided separately from the graphic processor, it becomes possible to directly process image data of YUV space (without converting it into RGB space) and to process high quality video data of 10 bits.

Hence, video data can be transformed by the texture mapping while satisfying image quality and real-time processing that may be required in the broadcast and commercial field.

Further, since information on the transformed shape and the like of an image is computed by using a graphic processor of comparatively low cost, the video data can be transformed into an arbitrary shape without causing hardware size being enlarged and cost increase.

Furthermore, information computed by the graphic processor offline is supplied to this image special effect device by means of a recording medium or networks. Hence, information on the transformed shape and the like of an image is computed by a graphic processor, for example, in a personal computer at a place away from the place where this image special effect device is provided, and after that, the video data can be pasted practically based on that information. Therefore, a work flow for texture mapping can be improved.

According to an embodiment of the present invention, the following effectiveness is obtained: video data can be transformed into an arbitrary shape by texture mapping without causing hardware size being enlarged and cost increase while satisfying image quality and real-time processing that may be required in the broadcast and commercial field.

Further, by supplying information computed by a graphic processor offline to an image special effect device through a recording medium or networks, such effectiveness is obtained that a work flow of texture mapping can be improved.

DESCRIPTION OF THE PREFERRED EMBODIMENTS

Figure 1:
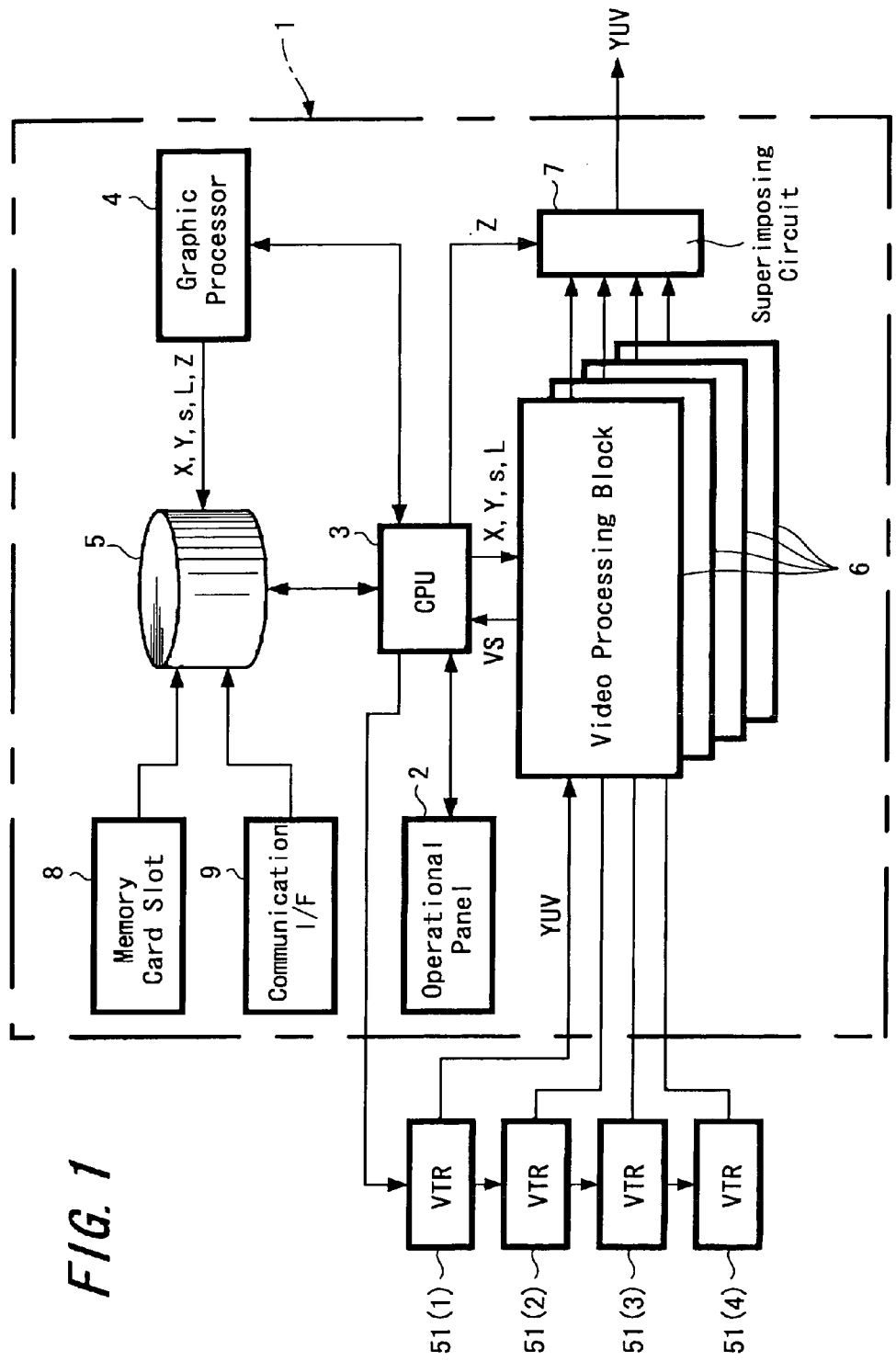
FIG. 1 is a block diagram showing an example of configuration of an image special effect device according to an embodiment of the present invention.

Hereinafter, embodiments of the present invention are explained specifically by using drawings. FIG. 1 is a block diagram showing an example of a configuration of an image special effect device according to an embodiment of the present invention. This image special effect device 1 is a device that is used as part of a non-linear editing system in a television broadcasting station and the like. The image special effect device 1 includes: an operational panel 2, CPU 3 (i.e. read out means/unit), graphic processor 4, buffer memory 5, video processing blocks 6 of four systems, superimposing circuit 7, small-memory-card slot 8 (i.e. read out means/unit) and communication interface 9 (i.e. communication means/unit) for network communication. The graphic processor 4 is installed in a slot (not shown in the figure) for a graphic processor, which is provided on a surface of a casing of the image special effect device 1. Each of video processing blocks 6 is connected to one VTR 51 [51(1) to 51(4)], respectively.

Using application software for 3D (three dimensional) computer graphics, the operational panel 2 prepares a model in virtual 3D space; specifies video data (maximum four systems) that is used as a texture; and performs settings of various parameters. The parameters include: an attribute of a surface of the model, view point, light source, transparency, resolution of a display screen, texture space, positional relationship in the depth direction in the case where video data of two or more systems are superimposed, and the like.

Based on the operation and the like of the operational panel 2, the CPU 3 controls each unit of the image special effect device 1 and each VTR 51.

The graphic processor 4 is an existing (commercially available) graphic processor in which a programmable shader is installed. However, this graphic processor 4 has a characteristic with respect to a content of processing that is programmed.

Figure 2:
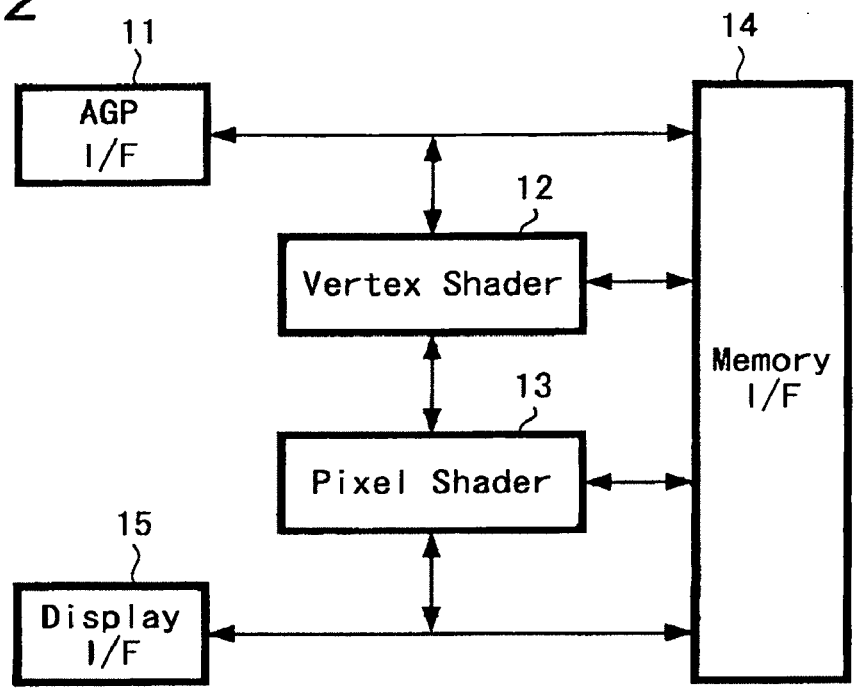
FIG. 2 is a block diagram schematically showing a configuration of a graphic processor in FIG. 1.

FIG. 2 is a block diagram schematically showing a configuration of the graphic processor 4. The graphic processor 4 includes an AGP interface 11 for transmitting data to and receiving data from an external CPU, a vertex shader 12 that performs geometric processing, a pixel shader 13 that performs rendering processing, a memory interface 14, and a display interface 15 for outputting image data (R, G and B information of 8 bits each and information α of 8 bits that expresses degree of transparency).

Before explaining the processing of the graphic processor 4 in this image special effect device 1, processing of the graphic processor 4 in the case where the graphic processor 4 is used in a typical method of the past is explained with reference to FIG. 3.

When vertex information on a polygon constituting a prepared model and various parameters are supplied from an external CPU, the vertex shader 12 converts coordinates in virtual 3D space into 2D (two dimensional) coordinates on a display screen (screen coordinates) (step S1). Then, texture coordinates (X, Y) of an image that is pasted to the model on the display screen and a reduction rate (s) of the model on the display screen are computed for each pixel unit of the display screen (step S2). Further, in the step S2, a lighting coefficient (L) for light-source processing is also computed for each pixel unit if a light source is set, and information in the depth direction (Z) which indicates a positional relationship of textures in the depth direction is also computed for each pixel unit if the textures of two or more systems are designated.

Subsequently, through the memory interface 14, the pixel shader 13 reads out a texture having a reduction rate close to the reduction rate (s) among textures stored in an external memory (DRAM) using the MIPMAP method by using coordinates (X, Y) as a read-address (step S3). Then, data on R, G and B of the texture is output from the display interface 15 (step S4). Note that, in the step S4, information on transparency (α) is also output from the display interface 15 if transparency is set as a parameter.

Figure 4:
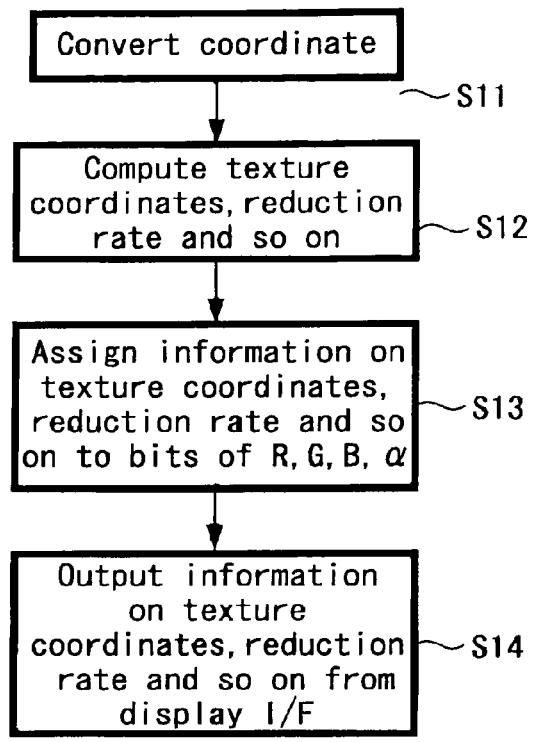
FIG. 4 is a diagram showing processing of the graphic processor in the image special effect device in FIG. 1.

On the contrary, FIG. 4 shows the processing of the graphic processor 4 in this image special effect device 1.

When a model is prepared and parameters are set by the operation of the operational panel 2, the CPU 3 supplies vertex information on a polygon that constitutes the prepared model, parameters that were set and ID that designates information to be output from the graphic processor 4, to the AGP interface 11 of the graphic processor 4 (see FIG. 2).

Note that, information designated by this ID includes information on the texture coordinates and information on the reduction rate of the model on the display screen without fail. Further, this information includes a lighting coefficient for light-source processing if a light source is set as a parameter. Furthermore, if a positional relationship in the depth direction in the case where video data of two or more systems are superimposed is set as a parameter, this information includes information on depth that indicates the positional relationship.

When these information, parameters and ID are supplied from the CPU 3, a vertex shader 12 converts coordinates in virtual 3D space into 2D (two dimensional) coordinates (screen coordinates) (step S11). Then, texture coordinates (X, Y) of an image pasted to the model on the display screen and a reduction rate (s) of the model on the display screen are computed for each pixel unit of the display screen (step S12). In addition, in the step S12, a lighting coefficient (L) for light-source processing is also computed for each pixel unit if a light source is set, and information in the depth direction (Z) which indicates a positional relationship in the depth direction of two or more video data is also computed for each pixel unit if the video data of two or more systems are designated.

Figure 3:
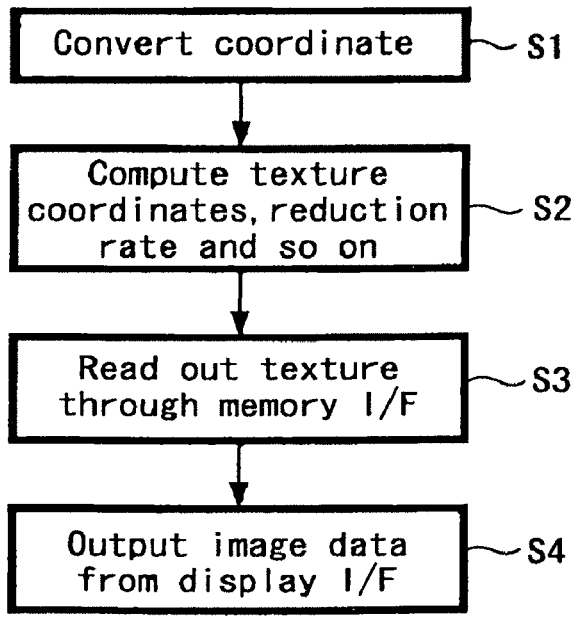
FIG. 3 is a diagram showing processing of a graphic processor by using a typical method in the past.
Figure 5:
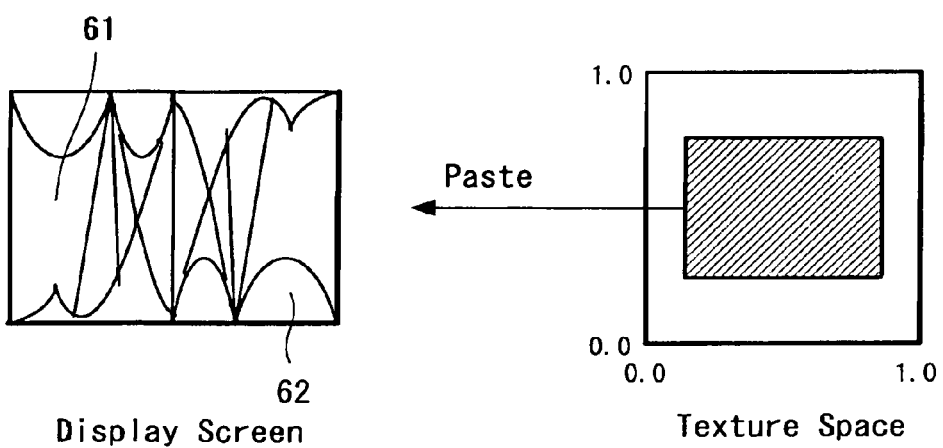
FIG. 5 is a diagram showing an example of a model on screen coordinates and texture coordinates of an image that is pasted to the model.

The processing up to these steps S11 and S12 is the same as the processing up to the steps S1 and S2 in FIG. 3. FIG. 5 is a diagram showing an example of a model on screen coordinates (on a display screen) converted in the step S11 and texture coordinates computed in the step S12. In this example, an image of the texture coordinates of a shaded portion in texture space is pasted to a display position of a wave model 61 on the display screen.

Subsequently, information on the texture coordinates and reduction rate that are designated by the ID from the CPU 3 is assigned to bits of R, G, B and α (step S13) by the pixel shader 13. In other words, information on the texture coordinates (X, Y) and reduction rate (s) computed by the vertex shader 12 is assigned to these bits without fail. Further, a lighting coefficient (L) and information on depth (Z) are also assigned to bits of R, G, B and α if the lighting coefficient and information on depth are designated by this ID.

Then, this information assigned to bits of R, G, B and a is output from the display interface 15 (step S14).

Figure 6:
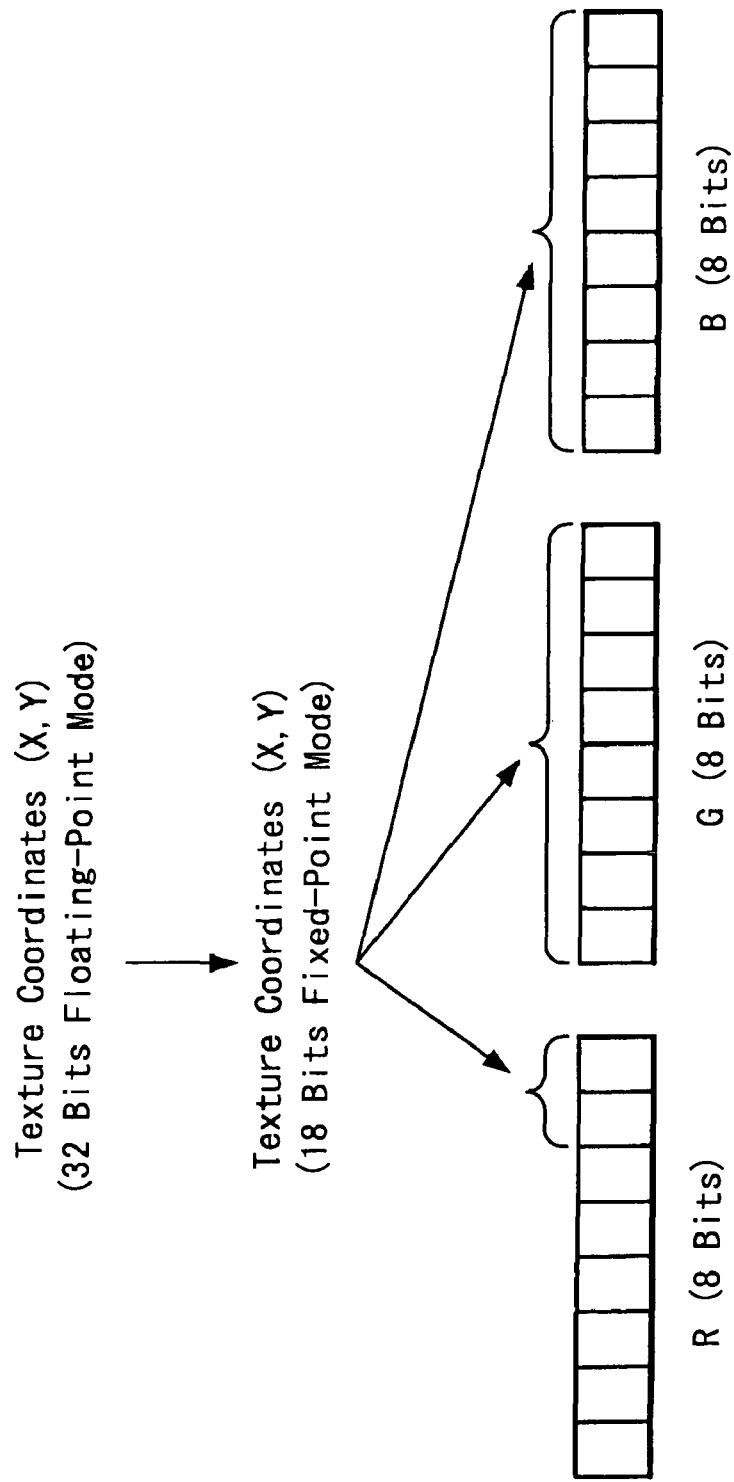
FIG. 6 is a diagram showing an example in which texture coordinates are assigned to bits of R, G and B in the processing in FIG. 4.

FIG. 6 is a diagram showing an example of the step S13 in which the texture coordinates (X, Y) are assigned. In this example, the texture coordinates (X, Y) computed by a floating-point mode of 32 bits are converted into a fixed-point mode of 18 bits (14 bits for integer, 4 bits for decimal), and the 18 bits are separated and assigned to low-rank 2 bits of R, 8 bits of G and 8 bits of B. The reduction rate (s) (as well as the lighting coefficient (L) and information on depth (Z) if those were computed) is also assigned to the remaining bits of R or to the bits of α, similarly.

As described above, the graphic processor 4 is programmed to output information on texture coordinates (X, Y), reduction rate (s) and the like of a pixel unit of the display screen from the display interface 15. In addition, if this program is onerously or gratuitously distributed as a packaged medium such as CD-ROM or the like, a user can use a graphic processor that the user already owns as the graphic processor 4 in this image special effect device 1.

As shown in FIG. 1, information on texture coordinates (X, Y), reduction rate (s) and the like of a pixel unit, which is output from the graphic processor 4, is transmitted to the buffer memory 5.

In the buffer memory 5, values of YUV (luminance and chrominance difference) signals of 10 bits that represent the brightness and colors of a background portion (background 62 in FIG. 5, for example) of the display screen have been written into memory areas corresponding to all pixels of the display screen as initialization processing by the CPU 3. Then, information on texture coordinates (X, Y), reduction rate (s) and the like from the graphic processor 4 is overwritten in this initialized buffer memory 5. Therefore, values of the YUV signals of initial values remain as they are in the memory areas corresponding to the pixels to which information on texture coordinates (X, Y), reduction rate (s) and the like was not overwritten (that is, pixels in the background portion on the display screen), among the memory areas in the buffer memory 5.

In addition, information read out from a small memory card by the slot 8 and information received by the communication interface 9 through networks can be overwritten in the buffer memory 5.

Figure 7:
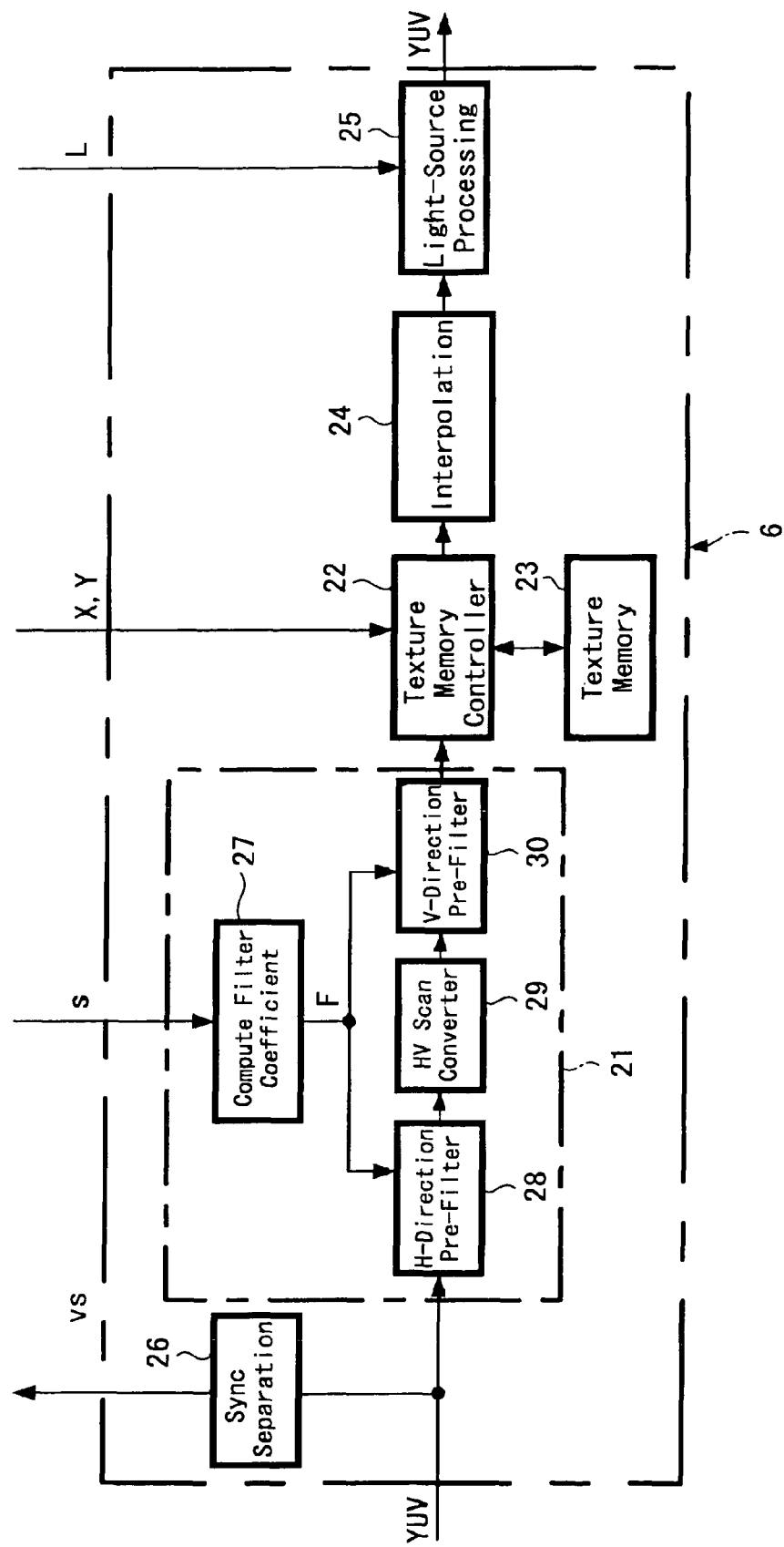
FIG. 7 is a diagram showing a configuration of a video processing block in FIG. 1.

FIG. 7 is a block diagram showing a configuration of each video processing block 6. The video processing block 6 is configured with hardware circuits, and includes a pre-filter unit 21, texture controller 22, texture memory 23, interpolating circuit 24, light-source processing circuit 25 and sync separation circuit 26. The pre-filter unit 21 is configured to have a filter coefficient computational circuit 27, H (horizontal) direction pre-filter 28, HV scan-converter 29 and V (Vertical) direction pre-filter 30.

Video data (YUV (luminance and chrominance difference) signals of 10 bits) reproduced by the VTR 51 (shown in FIG. 1) connected to each video processing block 6 is supplied to the pre-filter unit 21 and sync separation circuit 26. The sync separation circuit 26 separates a vertical sync signal (vs) from this video data, and transmits the vertical sync signal (vs) to the CPU 3 in FIG. 1.

In synchronization with this vertical sync signal (vs), the CPU 3 reads out the stored information in the memory areas corresponding to all pixels of the display screen sequentially from the buffer memory 5 for each frame of the video data.

The CPU 3 reconstructs the texture coordinates (X, Y), reduction rate (s), lighting coefficient (L) and depth information (z) by using a RAM inside the CPU 3, with respect to pixels from which values other than the initial values (values of YUV signals in the background) were read out. For example, in the case where the texture coordinates (X, Y) are assigned such that the Y is divided into a low rank 2 bits of R, 8 bits of G and 8 bits of B, as shown in FIG. 6, the texture coordinates (X, Y) are reconstructed from those bits.

The CPU 3 supplies information on the texture coordinates (X, Y) to the texture memory controller 22 of each video processing block 6 (see FIG. 7); supplies information on the reduction rate (s) to the pre-filter unit 21 of each video processing block 6 (see FIG. 7); supplies the lighting coefficient (L) to the light-source processing circuit 25 of each video processing block 6 (see FIG. 7); and supplies the depth information (Z) to the superimposing circuit 7.

Further, the CPU 3 supplies the data of initial values, as it is, to the texture memory controller 22 of each video processing block 6, with respect to pixels in which the initial values (values of YUV signals in the background) were read out.

As shown in FIG. 7, in the pre-filter unit 21 of each video processing block 6, the filter coefficient computational circuit 27 computes a filter coefficient (F) for reducing video data correspondingly to a reduction rate (s) from the CPU 3 (see FIG. 1) and supplies the filter coefficient (F) to the H-direction pre-filter 28 and V-direction pre-filter 30.

The H-direction pre-filter 28 performs filtering (filtering in the horizontal direction of the screen) of the video data supplied from a VTR 51 (see FIG. 1) using this filter coefficient (F) and transmits the result to the HV scan converter 29.

After writing video data of one frame into an internal memory, the HV scan-converter 29 reads out from the memory the data of each pixel in the vertical direction of the screen to scan-convert the video data. Then, the video data scan-converted is transmitted to the V-direction pre-filter 30.

The V-direction pre-filter 30 performs filtering (filtering in the vertical direction of the screen) of this video data using the filter coefficient (F).

The video data on which filtering was performed by the V-direction pre-filter 30 is transmitted to the texture memory controller 22 from the pre-filter unit 21.

After writing this video data into the texture memory 23, the texture memory controller 22 reads out video data of each pixel of the display screen from the texture memory 23 by using the texture coordinates (X, Y) from the CPU 3 (see FIG. 1) as the read-address. (When resolution of display screen and resolution of video data are equal, data on a pixel position corresponding to the pixel of the display screen is read out. When resolution of display screen is higher than resolution of video data, data on a plurality of (four or eight) pixel positions in the vicinity of the pixel of the display screen are read out.) Then, the video data read out is transmitted to the interpolating circuit 24.

However, among the pixels of the display screen, with respect to the pixels to which data of the initial values (values of YUV signals in the background) was supplied from the CPU 3 (see FIG. 1), the texture memory controller 22 does not perform the readout from the texture memory 23, and the initial values are transmitted to the interpolation circuit 24 without any change.

In the case where data on a plurality of pixel positions is transmitted with respect to one pixel of the display screen (when resolution of display screen is higher than resolution of video data, as mentioned above), the interpolation circuit 24 generates data corresponding to the pixel of the display screen by performing the linear interpolation on the plurality of data. Then, the data generated is transmitted to the light-source processing circuit 25. In other cases than that, the interpolating circuit 24 transmits the data transmitted from the texture memory 23, as it is, to the light-source processing circuit 25.

Among the pixels of the display screen, with respect to pixels to which the lighting coefficient (L) was supplied from the CPU 3 (see FIG. 1), the light-source processing (expression of reflected light and shadow) corresponding to this lighting coefficient (L) is performed by the light-source processing circuit 25 on the video data from the interpolating circuit 24. With respect to the other pixels than those, the light-source processing circuit 25 outputs the video data transmitted from the interpolating circuit 24, as it is.

The video data output from the light-source processing circuit 25 of each video processing block 6 is supplied to the superimposing circuit 7, as shown in FIG. 1. In the case where the depth information (Z) is supplied from the CPU 3 (see FIG. 1), the superimposing circuit 7 superimposes the video data of two or more systems (maximum four systems) provided from each video processing block 6 in accordance with this depth information (Z). In other cases than that (in other words, in the case that the video data is supplied only from one video processing block 6), the superimposing circuit 7 outputs the video data supplied, as it is.

The video data (YUV signals of 10 bits) output from the superimposing circuit 7 is transmitted to an image recording device, monitor and the like (not shown in the figure) that are connected to the image special effect device 1.

As explained above, by programming the existing programmable graphic processor 4, this image special effect device 1 performs processing not related to the image quality among the processing of texture mapping. The processing not related to the image quality is the processing that computes and outputs information on the transformed shape and the like of the image (texture coordinates (X, Y), reduction rate (s), lighting coefficient (L) and depth information (Z)).

In other words, in a typical method of using a graphic processor of related art, information on the texture coordinates, reduction rate and the like is used only within the graphic processor, and image data finally transformed is output from the graphic processor. On the contrary, in this image special effect device 1, the graphic processor 4 is programmed such that information itself on the texture coordinate, reduction rate and the like is output from the display interface 15 of the graphic processor 4.

Regardless of resolution of video data, a period of time necessary for the computation and output processing of information on the texture coordinates, reduction rate and the like is constant, and so real-time processing can be performed.

On the other hand, the processing of video data itself that is the processing relating to the image quality is performed by the video processing block 6 configured with the hardware circuits based on the information output from the graphic processor 4. In the video processing block 6, the filtering (reduction) of the input video data is performed in the pre-filter unit 21 in accordance with information on reduction rate (s) supplied from the graphic processor 4. Then, after written into a texture memory 23, the video data is read out from the texture memory 23 by using information on the texture coordinates (X, Y) supplied from the graphic processor 4 as the read-address. (When the lighting coefficient (L) and the depth information (Z) are also output from the graphic processor 4, the light-source processing and the superimposing processing in the superimposing circuit 7 are performed in accordance with the above information.) And then, the video data is pasted to a model on the display screen. Therefore, the video data is pasted after the filtering was suitably performed on the video data correspondingly to the reduction rate of the model on the display screen, and so aliasing can be controlled sufficiently.

Further, as described above, since the video data is processed by another hardware circuit provided separately from the graphic processor 4, it becomes possible to directly process the image data of the YUV space (without converting it into RGB space) and to process high quality video data of 10 bits.

Accordingly, video data can be transformed by texture mapping while satisfying the image quality and real-time processing that may be required in the broadcast and commercial field.

Further, because information on the transformed shape and the like of the image is computed by using the graphic processor 4 of comparatively low cost, video data can be transformed into an arbitrary shape without causing hardware size being enlarged and cost increase.

Furthermore, using a personal computer with a graphic processor being installed and performing the same program as the graphic processor 4, for example, the texture coordinates (X, Y), reduction rate (s) and the like are computed offline (in the state in which the image special effect device 1 is not provided near). Subsequently, the computed information is supplied to the image special effect device 1 through a small memory card or networks (namely, read out from the small memory card by a slot 8 to be stored into the buffer memory 5, or received by the interface 9 to be written into the buffer memory 5), and the video data can practically be pasted in the video processing block 6 of the image special effect device 1 based on that information. Therefore, the work flow for the texture mapping can also be improved.

Note that, although four systems of the video processing blocks 6 are provided in the image special effect device 1 in the above embodiment, needless to say, the number of systems can be arbitrarily selected such as three systems or fewer, five systems or more and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A broadcast and commercial image special effect device, comprising:
    a controller;
    a memory unit connected to said controller;
    a graphic processor, connected to said memory unit, in which a programmable shader is installed; and
    a video processing block, connected to said controller, configured with hardware circuits for outputting YUV video data;
    said graphic processor being programmed to execute
        processing that converts coordinates in virtual three-dimensional space into two-dimensional coordinates on a display screen in accordance with a supply of information on a shape of a model in the virtual three-dimensional space and computes texture coordinates of an image that are pasted on the display screen and a reduction rate of the model on the display screen, and
        processing that outputs said texture coordinates (X,Y) as stored in two bits of R data, eight bits of G data and eight bits of B data and that outputs said reduction rate as stored in remaining bits of the R data from an image data output unit to said memory unit;
    said video processing block including
        a pre-filter that performs filtering of input video data by using a pre-filter coefficient corresponding to the reduction rate supplied thereto by said controller,
        a memory to which the video data filtered by said pre-filter is written,
        a control circuit that reads out the video data from said memory by using supplied texture coordinates as read-address information; and
    wherein said texture coordinates output from said graphic processor and stored in said memory unit is supplied to said control circuit of said video processing block from the memory unit by the controller, and
    said reduction rate output from said graphic processor and stored in said memory unit is supplied to said pre-filter of said video processing block from the memory unit by the controller.

2. The image special effect device according to claim 1,
    wherein said graphic processor is programmed further to execute processing that computes a coefficient in light-source processing, and to output said coefficient from said image data output unit as well,
    said video processing block further includes a light-source processing circuit that performs light-source processing corresponding to the supplied coefficient on the video data read out from said memory, and
    said coefficient output from said graphic processor is supplied to said light-source processing circuit of said video processing block.

3. The image special effect device according to claim 1,
    wherein said graphic processor is programmed further to execute processing that computes a depth direction in the case where the video data of two or more systems are superimposed to be displayed, and to output said depth direction from said image data output unit as well;
    two or more systems of said pre-filter, said memory and said control circuit are included to process the video data of two or more systems in parallel, and a superimposing circuit is further included by which the video data read out from said memory of each system is superimposed correspondingly to the depth direction supplied; and said depth direction output from said graphic processor is supplied to said superimposing circuit.

4. The image special effect device according to claim 1, wherein said memory unit stores said texture coordinates and said reduction rate output from said image data output unit of said graphic processor, wherein said texture coordinates and said reduction rate are read out from said memory unit in synchronization with the video data input to said video processing block and are supplied to said control circuit and said pre-filter of said video processing circuit, respectively.

5. A broadcast and commercial image special effect device comprising:

a controller;

a memory unit connected to the controller;

readout means, connected to the memory unit, for reading out information from a recording medium; and a video processing block, connected to the controller, configured with a hardware circuit for outputting YUV video data;

said video processing block including a pre-filter that performs filtering of input video data by using a pre-filter coefficient corresponding to a reduction rate that is supplied thereto, a memory to which the video data filtered by said pre-filter is written, and a control circuit that reads out the video data from said memory by using a texture coordinates (X, Y) supplied thereto as read-address information; and wherein the texture coordinates and the reduction rate are read out from the recording medium by said readout means and stored in the memory unit, the texture coordinates and reduction rate are supplied to said control circuit and said pre-filter of said video processing block, respectively, from the memory unit by the controller, wherein the texture coordinates (X, Y) being stored in two bits of R data, eight bits of G data and eight bits of B data in the memory unit and the reduction rate being stored in remaining bits of the R data in the memory unit.

6. The image special effect device according to claim 5, wherein said recording medium stores a coefficient in light-source processing;

said video processing block further includes a light-source processing circuit that performs the light-source processing corresponding to the supplied coefficient in the light-source processing with respect to the video data read out from said memory; and the coefficient in the light-source processing that is read out from the recording medium by said readout means is supplied to said light-source processing circuit of said video processing block.

7. The image special effect device according to claim 5, wherein said recording medium stores a depth direction in the case where video data of two or more systems are superimposed to be displayed;

two or more systems of said pre-filter, said memory and said control circuit are included to process the video data of two or more systems in parallel, and a superimposing circuit is further included by which the video data read out from said memory of each system is superimposed correspondingly to the depth direction supplied; and said depth information read out from the recording medium by said readout means is supplied to said superimposing circuit.

8. A broadcast and commercial image special effect device comprising:

a controller;

a memory unit connected to the controller;

communication means, connected to the memory unit, for performing communication through networks; and a video processing block, connected to the controller, configured with a hardware circuit for outputting YUV video data;

said video processing block including a pre-filter that performs filtering of input video data by using a pre-filter coefficient corresponding to a reduction rate that is supplied thereto, a memory to which the video data filtered by said pre-filter is written, and a control circuit that reads out the video data from said memory by using texture coordinates (X, Y) supplied thereto as read-address information; and wherein the texture coordinates and the reduction rate are received by said communication means and are stored in the memory unit, the texture coordinates and the reduction rate are supplied to said control circuit and said pre-filter of said video processing block, respectively, from the memory unit by the controller, wherein the texture coordinates (X, Y) being stored in the memory unit in two bits of R data, eight bits of G data and eight bits of B data and the reduction rate being stored in the memory unit in remaining bits of the R data.

9. The image special effect device according to claim 8, wherein said video processing block further includes a light-source processing circuit that performs the light-source processing corresponding to a coefficient in the light-source processing, with respect to the video data read out from said memory, and the coefficient in said light-source processing that is received by said communication means is supplied to said light-source processing circuit in said video processing block.

10. The image special effect device according to claim 8, further comprising:

two or more systems of said pre-filter, said memory and said control circuit, to process the video data of two or more systems in parallel, and a superimposing circuit by which the video data read out from said memory of each system is superimposed correspondingly to a depth direction, wherein said depth direction that is received by said communication means is supplied to said superimposing circuit.

11. A graphic processor comprising a programmable shader installed, being programmed to execute processing that converts coordinates in virtual three-dimensional space into two-dimensional coordinates on a display screen in accordance with a supply of information on a shape of a model in the virtual three-dimensional space and computes texture coordinates (X, Y) of an image that is pasted on said display screen and a reduction rate of the model on the display screen; and processing that outputs said texture coordinates (X, Y) as stored in two bits of R data, eight bits of G data and eight bits of B data and said reduction rate stored in remaining bits of the R data from an image data output unit to a memory unit prior to being accessed and output by a controller to a video processing block for outputting YUV video data of an image special effect device.

12. A non-transitory computer-readable medium encoded with a program to cause a graphic processor, comprising a programmable shader, to execute the procedures of:
- converting coordinates in virtual three-dimensional space into two-dimensional coordinates on a display screen in accordance with a supply of information on a shape of a model in the virtual three-dimensional space and computing texture coordinates (X, Y) of an image that is pasted on the display screen and a reduction rate of the model on the display screen; and
- outputting said texture coordinates (X, Y) as stored in two bits of R data, eight bits of G data and eight bits of B data and said reduction rate stored in remaining bits of the R data from an image data output unit to a memory unit prior to being accessed and output by a controller to a video processing block for outputting YUV video data of an image special effect device.

13. A broadcast and commercial image special effect device comprising:
- a controller;
- a memory unit connected to the controller;
- a readout unit, connected to the memory unit, reading out information from a recording medium to the memory unit; and
- a video processing block, connected to the controller, configured with a hardware circuit for outputting YUV video data;
- said video processing block including
  - a pre-filter that performs filtering of input video data by using a pre-filter coefficient corresponding to a reduction rate to be supplied thereto,
  - a memory to which the video data filtered by said pre-filter is written, and
  - a control circuit, connected to the pre-filter and the memory, that reads out the video data from said memory by using texture coordinates (X, Y) supplied thereto as read-address information; and
- wherein the texture coordinates (X, Y) and the reduction rate, that are read out from the recording medium by said readout unit and stored in the memory unit, are supplied from the memory unit by the controller to said control circuit and said pre-filter of said video processing block, respectively, wherein the texture coordinates (X, Y) being stored in two bits of R data, eight bits of G data and eight bits of B data in the memory unit and the reduction rate being stored in the memory unit in remaining bits of the R data.

14. A broadcast and commercial image special effect device comprising:
- a controller;
- a memory unit connected to the controller;
- a communication unit, connected to the memory unit, performing communication through networks; and
- a video processing block, connected to the controller, configured with a hardware circuit for outputting YUV video data;
- said video processing block including
  - a pre-filter that performs filtering of input video data by using a pre-filter coefficient corresponding to a reduction rate that is supplied thereto,
  - a memory to which the video data filtered by said pre-filter is written, and
  - a control circuit, connected to the pre-filter and the memory, that reads out the video data from said memory by using texture coordinates (X, Y) supplied thereto as read-address information; and
- wherein the texture coordinates and the reduction rate, that are received by said communication unit and stored in the memory unit, are supplied from the memory unit by the controller to said control circuit and said pre-filter of said video processing block, respectively, wherein the texture coordinates being stored in the memory unit in two bits of R data, eight bits of G data and eight bits of B data and the reduction rate being stored in the memory unit in remaining bits of the R data.

* * * * *